United States Patent [19]

Schumm et al.

[11] Patent Number: 4,773,070

[45] Date of Patent: Sep. 20, 1988

[54] METHOD FOR CHECKING PROTECTIVE INSTRUCTION TRANSMISSION SYSTEMS IN ON-LINE OPERATION

[75] Inventors: Erwin Schumm, Neuried; Alfred Sterner, Munich, both of Fed. Rep. of Germany

[73] Assignee: Siemens Aktiengesellschaft, Berlin and Munich, Fed. Rep. of Germany

[21] Appl. No.: 917,364

[22] Filed: Oct. 9, 1986

[30] Foreign Application Priority Data

Oct. 25, 1985 [DE] Fed. Rep. of Germany ....... 3538484

[51] Int. Cl.$^4$ .............................................. G06F 11/22
[52] U.S. Cl. ........................................ 371/22; 371/68; 371/15; 364/900
[58] Field of Search ................. 371/7, 8, 9, 11, 15, 371/16, 17, 18, 22, 25, 31, 32, 34, 33, 49, 67, 68, 69; 364/200, 900

[56] References Cited

U.S. PATENT DOCUMENTS

| | | | |
|---|---|---|---|
| 3,910,322 | 10/1975 | Hardesty | 371/34 |
| 4,351,059 | 9/1982 | Gregoire | 371/34 |
| 4,385,384 | 5/1983 | Rosbury | 371/15 |
| 4,556,994 | 6/1984 | Segarra | 364/200 |
| 4,573,154 | 2/1986 | Nakata | 371/34 |
| 4,628,537 | 12/1986 | Shimakata | 371/34 |
| 4,683,569 | 7/1987 | Rubin | 371/68 |

Primary Examiner—Michael R. Fleming

[57] ABSTRACT

A method is provided for checking the operability of protective instruction transmission systems in on-line operation in which at least two stations, particularly multi-instruction equipment, are connected to one another by transmission links and communication channels. The stations each comprise instruction input and output lines for checking the protective instructions and a first station controlling and checking of the operability transmits a test signal to a second station to be tested, the second station returning the signal to the first station unaltered. Upon receipt of the test signal, the respective inhibit of the instruction input and output lines is effected in the first and second stations. Simultaneously, the first station emits the first test instruction which the second station returns to the first station immediately after receipt and, therefore, effects the transmission of further test instructions in the first station. A test function sequence formed of a plurality of test instructions is terminated by transmission of an idle instruction which cancels the inhibit of the instruction input and output lines in the first station and in the second station.

5 Claims, 2 Drawing Sheets

METHOD FOR CHECKING PROTECTIVE INSTRUCTION TRANSMISSION SYSTEMS IN ON-LINE OPERATION

BACKGROUND OF THE INVENTION

1. Field of the Invention

The present invention relates to a method for checking the functionability of protective instruction transmission systems in on-line operation in which at least two stations, particularly multi-instruction equipment, are connected by transmission links and communication channels, whereby the stations respectively comprise instruction input and output lines for the transmission of the protective instructions and a first station controlling the checking of the operability transmits a test signal to a second station to be tested, the second station returning the test signal to the first station unaltered.

2. Description of the Prior Art

Protective instruction transmission systems of the type set forth above are most frequently employed in supply concerns, particularly in electrical energy supply networks. Here, it is a matter of recognizing occurring errors within the systems as quickly as possible and limiting the effects of such errors within the network to a minimum. Therefore, for example, given shorts in the high-voltage networks, the affected line sections should be disconnected from the network as quickly as possible (selective protection) in order to avoid greater current outages and, under given conditions, total network interruptions.

Due to the increased pulse-noise insensitivity and the requirement for the greatest possible signal-to-noise ratio, the actual protective instructions are realized, among other things, by way of what is referred to as a multi-frequency keying, i.e., in order to execute a protective instruction keying is undertaken discontinually from the one of the existing frequencies, for example, as a quiescent instruction and is transmitted without interruption and with constant amplitude onto one of the three remaining operating frequencies, whereby the selection of the frequency is dependent on the region to be disconnected or, respectively, on the instruction to be executed.

For further enhancing the reliability of such protective instruction transmission systems, there is the possibility, given selective protection connections, to undertake what are referred to as loop tests in a known manner. A test signal is thereby manually or automatically transmitted from the station to be tested to a cooperating station in the supply network and the latter immediately returns the test signal to the testing station without signal modification. The additionally existing test instructions are subsequently successively transmitted in the same manner and are correspondingly acknowledged. Insofar as there is no inducement for a protective instruction in precisely this time, an undesired triggering and, therefore, the unintentional disconnection of the specific line regions within the network is suppressed.

These and similar switch measures can also be undertaken after telephone consultation between operators at the appertaining stations within the network when it is assured in both stations that no switch instructions can be effectively transmitted during checking of the functionability.

The methods described above, therefore, presume that no protective instruction transmission occurs during the test or, on the other hand, that the enablement of the protective instruction transmission must occur simultaneously in both stations.

SUMMARY OF THE INVENTION

The object of the present invention, therefore, is to provide a method with which the transmission of the protective instructions is assured at any time, independently of the manual or automatic checking of the operability of such protective instruction systems, i.e., during the check of the functionability as well, so that transmission systems having directly-controllable trigger events can also be incorporated into this check. Malfunctions, particularly due to time-different control events, should be reliably excluded in the individual stations. This is achieved by the following combination of features.

Upon receipt thereof in the second station and in the first station, the test signal respectively effects the inhibiting of the instruction input and output lines.

The test signal received by the first station controls the transmission of a first test instruction which, after reception, the second station returns to the first station and effects the transmission of a further test instruction in the first station.

A test function sequence formed of a plurality of test instructions is influenced of such by the transmission of an idle or quiescent instruction that, with the reception thereof in the first station and in the second station, the inhibiting of the instruction input and output lines respectively present therein is suppressed.

With the transmission of further test instructions respectively controlled after reception of the transmitted test signal, the test function sequence practically initiates a test spiral which allows all switch events to be traversed in the shortest possible time. In this manner, all occurring instructions, as well as instruction combinations, can be successively transmitted in both traffic directions. The respective answerback of the same test signal or, respectively, of the same test instructions from the second station, operated as a cooperating station to the first station to be checked is to be considered essential to the present invention insofar as the switch devices to be tested can also be monitored for operability without a cooperating station in that the transmitted test signal or, respectively, the individual test instructions are immediately returned from the transmitting device to the receiving device. This test function sequence is concluded with the transmission of the quiescent instruction which is transmitted after the last-transmitted instruction. This idle or quiescent instruction practically effects an opening of the test spiral and the release of the instruction input and output lines lines both stations which were inhibited during execution of the test function. Since this test function execution depends only on the transmission time of the instructions and amounts only to a few milliseconds, a function degradation of the protective instruction transmission system is suppressed to the greatest possible degree.

In accordance with an advantageous feature of the invention, the method is further safeguarded to the effect that, with the arrival of a protective instruction during the test function sequence, the idle instruction is immediately sent by the station receiving the protective instruction and, therefore, the test function execution is immediately interrupted. Since the inhibition of the instruction input and output lines is cancelled with the idle instruction in both stations, the pending instructions can be transmitted immediately without delay without having to previously wait for the conclusion of the check for operability.

A further advantageous feature of the invention provides that the transmitted test instructions are displayed within the testing station by way of a test indicator device. Faulty test instructions can therefore be immediately recognized and appropriate measures for alleviation can be initiated.

A further advantageous feature of the invention provides that the test function execution be automated and be automatically controlled by way of a time switching device.

A exemplary embodiment of the invention is particularly characterized by the following features.

The stations are respectively equipped with an instruction input controller for through-connecting the instruction input lines to an instruction transmitting device and are respectively equipped with an instruction output controller which through-connects the instruction output lines to an instruction receiving device.

The instruction input controller and the instruction output controller are subject, in common, to the control influence of an inhibit flip-flop which is activated upon receipt of the test signal and which prevents the through-connection of the instruction input and output lines.

The stations each comprise a test control sequencer which effects the through-connection of the test signals received from the instruction receiving device to the instruction transmitting device either directly or instruction offset, depending on a first trigger circuit controlled by a test start device.

The first trigger circuit is in communication with a second trigger circuit such that the test signal, upon through-connection to the instruction transmitting device, starts a delay circuit monitoring the maximum testing time interval which inhibits the test control sequencer after initialization and communicates an alarm to an alarm output controller.

The second trigger circuit is reset by the activated inhibit flip-flop for disconnection of the test signal.

The test control sequencer is controllable such that, with the recognition of an initiator signal or one of the protective instructions at the instruction input lines by an instruction recognition device and with a signal of the activated inhibit flip-flop, the test instructions just transmitted can be switched into the idle instruction.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENT

Figure 1:
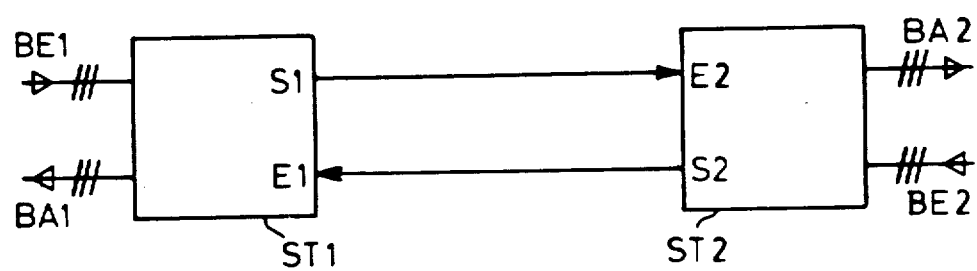
FIG. 1 is a block diagram illustration of a portion of an energy supply network.

FIG. 1 illustrates two stations ST1, ST2. It is assumed that the first station ST1 is the checking station and that the second station ST2 is used as the checked cooperating station. The stations ST1, ST2 each comprise their own transmitting and receive devices S, E, respectively, and are also connected to the instruction input lines BE and to the instruction output lines BA. The check for operability is realized by way of the signal and instruction transmissions indicated by the arrows, whereby the first station ST1 is also to be interpreted as the checked station which transmits the test signal or, respectively, the following test instructions from the transmitting device S1 to the receiving device E2 of the second station (cooperating station) ST2 which, in turn, returns the received signals and instructions to the receiving device E1 of the first station ST1 by way of the transmitting device S2. The indicated instruction input and output lines BE, BA are respectively composed of three separate lines by way of which the individual protective instructions can be transmitted within a network in the desired traffic directions.

Figure 2:
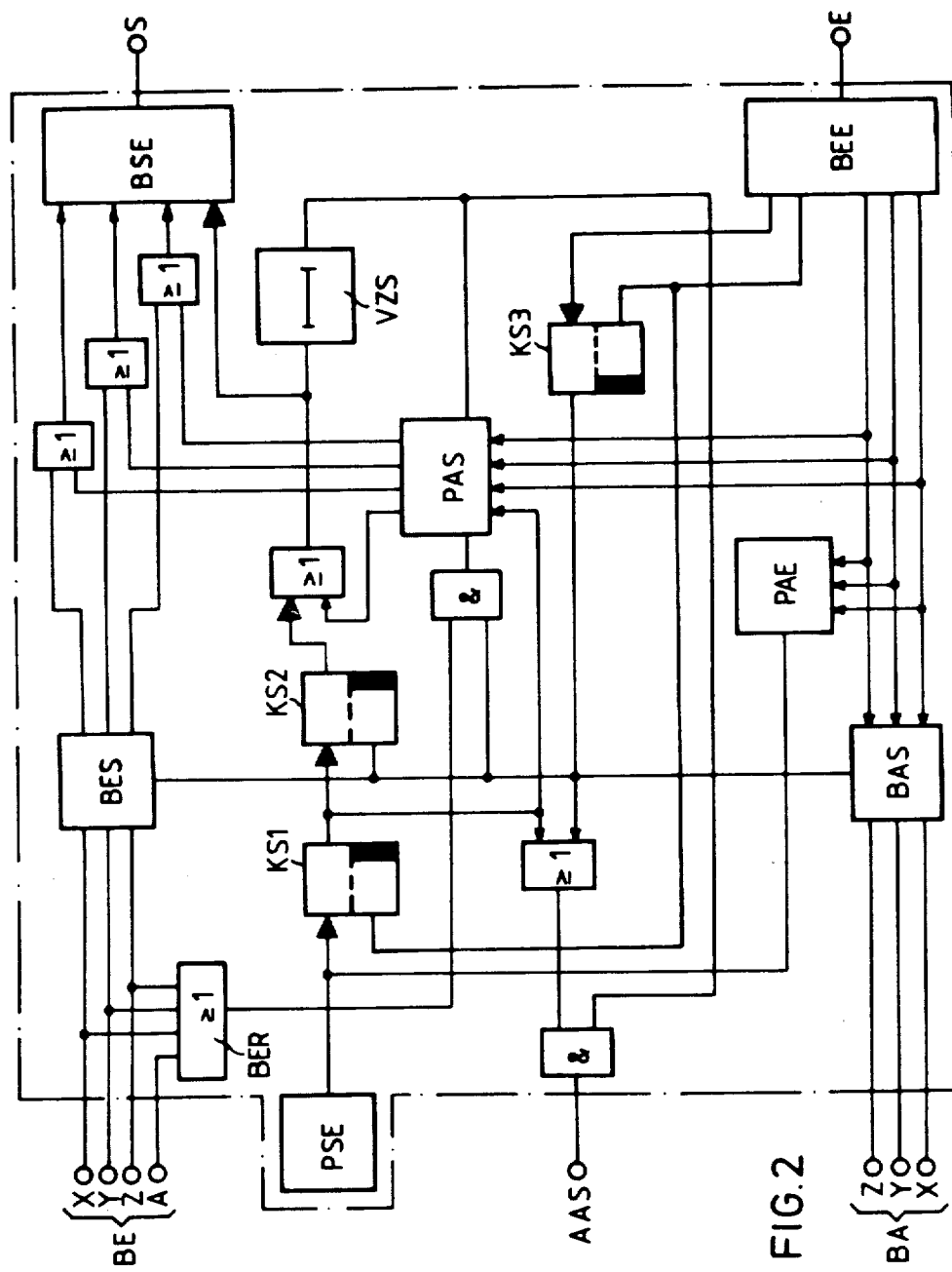
FIG. 2 is a schematic circuit diagram of a circuit arrangement for implementing the method of the present invention.

FIG. 2 illustrates a specific exemplary embodiment of a station, whereby the individual switch and control devices are merely indicated by their functional blocks. Among other things, each station contains the instruction transmitting device BSE by way of which the protective instructions X, Y, Z, together with the corresponding initiator signal A, under given conditions, can be transmitted via the instruction input lines BE to the instruction transmitting device BSE and, therefore, to the transmit output S by way of the the instruction input controller BSE via OR gates. By way of the receiving input E, test signals or, respectively, test instructions or protective instructions proceed to the instruction receiving device BEE, whereby the test signals and instructions are, in turn, directly transmitted to the instruction transmitting device BSE by way of appropriate activation of the test control sequencer PAS, whereas the protective signals are transmitted directly onto the instruction output lines BA by way of the instruction output controller BAS. The stations also each comprise the test start device PSE which transmits the test signal directly to the instruction transmitting device BSE by way of first and second trigger circuits KS1, KS2 and by way of via OR gate. Simultaneously with the transmission of the test signal, a delay circuit VZS is activated and assumes the chronological supervision of the overall test function execution. When, for example, the test signal or, respectively, one of the test instructions is not returned from the cooperating station within a maximum interval amounting to the overall time of the test function execution, then the timing of the time delay circuit VZS effects an inhibitant of the test control sequencer PAS and reports this malfunction to an alarm output controller AAS in conjunction with the still-existing test function execution. Each station also contains a test indicator device PAE with whose assistance the test signals or, respectively, test instructions received by the instruction receiving device BEE can be optically displayed within the station. The test start device PSE, shown merely as a functional block, can be operated both manually and automatically, for example, by way of a time switching device.

The normal test function is executed in such a manner that the first trigger circuit KS1 is set with the activation of the test start device PSE and, in turn, transmits the test signal (marked with black arrowheads) directly to the instruction transmitting device BSE with the activation of the second trigger circuit KS2. With the test signal, the delay circuit VZS is simultaneously started as a test time limitation for the maximally-allowable test time interval of the test function execution.

The test indicator device PAE is also initialized for receipt of the test instructions with the activation of the test start device PSE. The output signal generated by the set, first trigger circuit KS1 activates, first of all, the alarm output controller AAS in a preparatory manner and, secondly, initializes the test control sequencer PAS to what is referred to as the instruction offset. The initializing to the instruction offset means, in this context, that the test instruction to be subsequently transmitted is transmitted in a time-offset manner.

When the test signal is received by the cooperating station, an inhibit flip-flop KS3 is set, the output signal thereof immediately inhibiting the instruction input controller BES and the instruction output controller BAS. With the same signal, in addition, the alarm output controller is activated in a preparatory manner in the cooperating station and the test control sequencer PAS, insofar as no protective instruction X, Y, Z or, respectively, a corresponding initiator signal A is present, is influenced to the effect that the test signal is output directly via the instruction transmitting device BSE without instruction offset. In the same manner as in the testing station, the delay circuit VZS is activated with the transmission of the test signal, this representing a test time limitation for the maximally-allowable testing time duration of the test function execution.

As soon as the test signal emitted from the cooperating station is again received by the first station, the inhibit flip-flop KS3 is also set therein, namely in the same manner as in the cooperating station, thus inhibiting the instruction input controller BES and the instruction output controller BAS. Moreover, the second trigger circuit KS2 is reset with the same signal, so that no test signal can be emitted. Since, as already mentioned above, the first trigger circuit KS1 is set, the test control sequencer PAS is influenced such that the first test instruction is transmitted time-offset to the instruction transmitting device, i.e., with instruction offset, and is output.

This first instruction is now received by the cooperating station and, since received during the test function execution, is immediately fed to the instruction transmitting device BSE by way of the test control sequencer PAS therein.

The first test instruction is now received by the first station, is optically displayed by the test indicator device PAE and the test control sequencer PAS is simultaneously initiated to begin the output of the second test instruction with instruction offset. The second instruction, which is again received by the second station during the test execution sequence, is connected directly through to the instruction transmitting device BSE and is returned to the first station without instruction offset.

All subsequent test instructions or, respectively, their combinations, are transmitted between the two stations in the same manner and are optically displayed in the first station to be tested. With the reception of the last test instruction, the test control sequencer PAS is initiated to emit what is referred to as the idle or quiescent instruction with instruction offset, this being, in turn, accepted by the second station and acknowledged with the resetting of the inhibit flip-flop KS3. In response thereto, the alarm output controller AAS is inhibited in the second station and, simultaneously, the inhibit of the instruction input controller BES and the instruction output controller BAS is cancelled. The test control sequencer PAS of the second station is switched off and, simultaneously, the idle instruction is returned from the second station to the first station. As already previously carried out in the second station, the inhibit flip-flop KS3 is reset in the first station in response to receipt of the idle instruction, the first trigger circuit KS1 is reset with the idle instruction, the inhibit of the instruction input controller BES and the instruction output controller BAS is cancelled, the test control sequencer PAS in the first station is cleared and the idle instruction continues to be transmitted.

The malfunction-free test function execution is concluded with these switching measures.

When an instruction input is activated during the test function execution, i.e., when a protective instruction X, Y, Z or, respectively, the initiator signal A for one of these protective instructions is present at one of the instruction input lines BE, then the test function execution is terminated in compulsory fashion by the stations receiving a protective instruction X, Y, Z or, respectively, the initiator signal A. This occurs in such a manner that the instruction recognition device BER located within the station transmits a signal to the test executive sequencer PAS which emits the idle instruction in response thereto regardless of the test signals or, respectively, test instructions just received. Given the assumption that a protective instruction X is applied for transmission within the second station and this second station transmits the idle instruction to the first station, the inhibit flip-flop within the first station is reset in a known manner, the first trigger circuit KS1 is switched into the quiescent condition in response thereto and the alarm output controller AAS is inhibited. Simultaneously, the inhibit of the instruction input controller BES and the instruction output controller BAS of the first station is cancelled and the test control sequencer PAS is placed in the position to likewise transmit the idle instruction. With the receipt of the idle instruction in the second station, the inhibit flip-flop KS3 therein is also reset, the alarm output controller AAS is inhibited and, simultaneously, the inhibit of the instruction input controller and the instruction output controller is cancelled. The protective instruction X pending within the second station is now connected through to the instruction transmitting devoce BSE of the second station and connected through from the latter to the receiving input E of the first station via the transmit output S and, therefore, is connected through to the instruction receiving device BEE. The previously-enabled instruction output controller BAS feeds the instruction X to the corresponding instruction output line BA.

The protective instruction X is therefore transmitted from the second station to the first station by way of forced termination of the execution of the test function.

The test function is likewise controlled by way of the delay circuit VZS within the stations on the basis of transgression of the maximum testing time. The output signal of the delay circuit VZS, first of all, activates the test control sequencer PAS for transmission of the idle instruction and, secondly, drives the alarm output controller AAS which signals a fault status. Within the reception of the idle instruction in the corresponding cooperating station, the inhibit flip-flop KS3 is reset and, as set forth above, the alarm output controller AAS is therefore inhibited and, simultaneously, the inhibited state of the instruction input controller BES and the instruction output controller BAS is cancelled, so that the idle instruction is likewise transmitted with the enabling of the test control sequencer PAS. The receipt of the idle instruction within the stations in which the testing time limitation had been indicated by the delay circuit VZS likewise causes the resetting of the inhibit flip-flop KS3, and therewith the alarm output controller AAS is simultaneously inhibited and the inhibit of the instruction input controller BES and the output controller BAS is, in turn, cancelled. With the disconnection of the test control sequencer PAS, the idle instruction is likewise transmitted from this station. The delay circuit VZS is therefore inactive again and is not employed again for testing time supervision until a new test function execution is carried out.

The individual functional units shall be set forth in greater detail below or, respectively, the realization shall be specified with the commercial manufacturer's designation of the module circuits.

The instruction transmitting device BSE and the instruction receiving device BEE can be realized by the transmitting and receiving amplifier A22643-B32-X and A22643-B35-X contained in the protective signal transmission unit SWT 500 F6. The instruction input controller BES by way of which the protective instructions X, Y, Z, A are fed to the instruction transmitting device BSE by way of and OR gate represents a NAND gate comprising two respective inputs and a negated output which, for example, can be represented by the module 74 AL S00 A. Dependent on the overall time of the execution of the test, the delay circuit VZS can be composed of two series-connected one-shot multivibrators of the type 74 LS 123 by appropriately-selected capacitors between the terminals CEXT and REXT/CEXT.

The test control sequencer PAS, for example, can be composed of two programmable read-only memories, for example PROM 32×8/74S228, whereby the test signals or, respectively, test instructions arriving from the instruction receiving device BEE are fed to the inputs of the control block of the first PROM and the outputs of the output block of the same PROM control the RS flip-flops (74 LS 279) and light-emitting diodes located in the test indicator device PAE. The same test signals or, respectively, test instructions are also fed to the inputs of the control block of a second PROM, whereas the control block outputs of the second PROM simultaneously form the inputs of the OR gates (NOR element 1012, not shown detail), so that the test signals or test instructions can be transmitted from the test control sequencer PAS to the instruction transmitting device BSE.

Like the instruction input controller BES, the instruction output controller BAS can be realized by a NAND gate, for example 74 LS 10, whereby the outputs of these NAND gates directly transmit the protective signals X, Y, Z, A arriving by way of the instruction receiving device BEE to the instruction output lines BA.

The instruction recognition device BER can be formed, for example, of a NOR gate 4002 B and of a NAND gate 74 LS 00, whereby the protective instructions X, Y, Z from the instruction input BE represent the inputs of the NOR gate and the output thereof with the initiator signal A form the input of the NAND gate. With an inhibit signal of the third trigger circuit KS3, the output signal of the NAND gate disconnects the test control sequencer PAS via a further NAND gate, so that the idle instruction can be transmitted and, therefore, the interrupt of the test routine can occur.

The test start device PSE and the alarm output controller AAS can each be realized by a RS flip-flop, for example 74 LS 279. Within the test start device PSE, the trigger circuit is to be driven by a manually-actuated switch in order to start the test instruction with the output signal. The output of the trigger circuit in the alarm output controller AAS is connected to a light-emitting diode so that the alarm state can be optically displayed.

We claim:

1. A method for checking the operability of protective instruction transmission systems in on-line operation in which at least two stations are connected to one another by transmission links and communication channels, and in which each of the stations comprises instruction input and output lines for the transmission of the protective instructions, and in which a first station controls the check of the operability and transmits a test signal to a second station to be tested and a second station returns the test signal unaltered to the first station, comprising the steps of:

in response to receipt of the test signal in the second station and in the first station, inhibiting the instruction input and output lines;

emitting a first test instruction from the first station;

receiving the test instruction in the second station and transmitting the same back to the first station;

in response to receipt of the first test instruction in the first station, transmitting a further test instruction from the first station to the second station; and transmitting a plurality of test instructions as a test function sequence from the first station and transmitting an idle instruction; and cancelling the inhibition of the instruction input and output lines in response to the idle instruction.

2. The method of claim 1, and further defined as:

transmitting an idle instruction immediately in response to receipt of a protective instruction during execution of the test function.

3. A circuit arrangement for checking the operability of a protective instruction transmission system in on-line operation in which at least two stations are connected to one another by a transmission medium, or in each of said stations comprises:

an instruction transmitting device connected to said transmission medium, an instruction receiving device connected to said transmission medium, instruction input lines, instruction output lines, an instruction input controller connected between said instruction input lines and said instruction transmitting device and operable to connect said instruction input lines to said instruction transmitting device, and an instruction output controller connected between said instruction receiving device and said instruction output lines and operable to connect said instruction receiving device to said instruction output lines;

an inhibit flip-flop connected to said instruction receiving device and connected to said instruction input controller and said instruction output controller and operable in response to receipt of a test signal to inhibit operation of said instruction input controller and said instruction output controller;

a test start device operable to generate a test start signal;

a control sequencer connected to said instruction receiving device and operable to through-connect test signals from said instruction receiving device to said instruction transmitting device directly in response to said test start signal, and a first trigger circuit connected to receive said test start signal and operable to cause such through-connection time offset;

a delay circuit connected to said test control sequencer;

a second trigger circuit connected to said first trigger circuit and to said delay circuit and operable in response to operation of said first trigger circuit to transmit said test signal to said test control sequencer via said delay circuit to inhibit said test control sequencer for a predetermined duration;

an alarm signal output connected to said delay circuit;

said second trigger circuit connected to and operated by said inhibit flip-flop for disconnection of said test signal; and an instruction recognition device connected between said instruction input lines and said test control sequencer and operable in response to receipt of an initiator signal or a protective instruction and in response to activation of said inhibit flip-flop to generate an idle instruction.

4. The apparatus of claim 3, wherein each of said stations comprises:

a test indicator device connected to said instruction receiving device for optically displaying the test instructions received during execution of a test function.

5. The apparatus of claim 3, wherein:

said test start device comprises an automatically controllable time switching device.

* * * * *